US008865028B2

(12) United States Patent
Hong et al.

(10) Patent No.: US 8,865,028 B2
(45) Date of Patent: Oct. 21, 2014

(54) ZNO-BASED VARISTOR COMPOSITION (75) Inventors: Youn-Woo Hong, Daegu (KR);
Hyo-Soon Shin, Gyeonggi-do (KR);
Dong-Hun Yeo, Seoul (KR); Sang-Sub Roh, Incheon (KR); Kyung-Pyo Hong, Gyeonggi-do (KR); Jun-Hwan Jeong, Incheon (KR)

(73) Assignee: Amotech Co. Ltd. (KR)

( * ) Notice: Subject to any disclaimer, the term of this patent is extended or adjusted under 35 U.S.C. 154(b) by 265 days.

(21) Appl. No.: 13/392,310

(22) PCT Filed: Aug. 26, 2010

(86) PCT No.: PCT/KR2010/005747
§ 371 (c)(1),
(2), (4) Date: Feb. 24, 2012

(87) PCT Pub. No.: WO2011/025283
PCT Pub. Date: Mar. 3, 2011

(65) Prior Publication Data
US 2012/0153237 A1    Jun. 21, 2012

(30) Foreign Application Priority Data

Aug. 27, 2009  (KR) .................. 10-2009-0079746
Dec. 22, 2009  (KR) .................. 10-2009-0129211

(51) Int. Cl.
*H01B 1/08* (2006.01)
*C04B 35/453* (2006.01)
*C04B 35/626* (2006.01)

(52) U.S. Cl.
CPC ....... *C04B 35/453* (2013.01); *C04B 2235/3241* (2013.01); *C04B 2235/77* (2013.01); *C04B 35/6262* (2013.01); *C04B 35/6261* (2013.01); C04B 2235/3284 (2013.01); C04B 2235/3206 (2013.01); C04B 2235/72 (2013.01); C04B 2235/6567 (2013.01); C04B 2235/442 (2013.01); C04B 2235/3208 (2013.01); C04B 2235/3244 (2013.01); C04B 2235/656 (2013.01); *C04B 2235/6025* (2013.01); *C04B 2235/3217* (2013.01); *C04B 2235/3227* (2013.01); *C04B 2235/3277* (2013.01)
USPC ....................................... 252/519.51; 338/21

(58) Field of Classification Search
CPC .......... H01B 1/08; C04B 35/453; H01C 7/10; H01C 7/112; H02H 9/04
USPC ................. 252/519.5, 519.51, 521.2; 338/21; 361/127
See application file for complete search history.

(56) References Cited

U.S. PATENT DOCUMENTS 4,160,748 A * 7/1979 Yodogawa et al. ........ 252/519.5
5,640,136 A * 6/1997 Yodogawa et al. ............. 338/20
(Continued)

FOREIGN PATENT DOCUMENTS

JP          07-201532        8/1995
JP     10-2004-0083516      10/2004
(Continued)

Primary Examiner — Mark Kopec
(74) Attorney, Agent, or Firm — Wells St. John P.S.

(57) ABSTRACT

Disclosed herein is a ZnO-based varistor composition including zinc oxide (ZnO) as a main component and a calcium (Ca)-containing compound as an accessory component. The varistor composition provides excellent electrostatic discharge (ESD) characteristics because it has excellent physical properties, such as a nonlinear coefficient, a clamping voltage ratio, a surge absorbance and the like, and, particularly, does not include $Bi_2O_3$. Further, the varistor composition provides high work safety because it does not include $Sb_2O_3$ that is regulated for environmental purposes. Further, the varistor composition can reduce the manufacturing cost of a varistor because it does not Pr-based components that require high-temperature sintering and increase the manufacturing cost of a varistor. Particularly, the varistor composition has a low clamping voltage as well as a low capacitance.

19 Claims, 9 Drawing Sheets (56) References Cited

U.S. PATENT DOCUMENTS

| | | | | |
|---|---|---|---|---|
| 5,707,583 | A | * | 1/1998 | Yodogawa .................... 264/617 |
| 5,870,273 | A | * | 2/1999 | Sogabe et al. ............. 361/306.3 |
| 2009/0015367 | A1 | | 1/2009 | Matsuoka |

FOREIGN PATENT DOCUMENTS

| | | |
|---|---|---|
| JP | 2005-022900 | 1/2005 |
| JP | 2007-099532 | 4/2007 |
| JP | 2009-021301 | 1/2009 |
| KR | 10-1998-0032769 | 7/1998 |
| KR | 10-2003-0078095 | 10/2003 |
| KR | 10-2009-0006017 | 1/2009 |
| KR | 10-2009-0067063 | 6/2009 |
| WO | WO 2011/025283 A2 | 8/2010 |
| WO | WO 2011/025283 A9 | 8/2010 |

* cited by examiner

| Cr (at%) | α | tanδ | ε (1MHz) |
|---|---|---|---|
| 0.1 | 49 | 0.283 | 577 |
| 0.5 | 34 | 0.149 | 782 |
| 1.0 | 27 | 0.086 | 1,037 |
| 2.0 | 28 | 0.209 | 489 |
| 3.0 | 35 | 0.308 | 401 |

ZNO-BASED VARISTOR COMPOSITION

CROSS REFERENCE TO RELATED APPLICATION

This is a 35 U.S.C. §371 application of, and claims priority to, International Application No. PCT/KR2010/005747, which was filed on Aug. 26, 2010 and published in Korean as Publication no. WO 2011/025283, which claims priority to Korean Patent Application no. 10-2009-0079746 filed on Aug. 27, 2009 and claims priority to Korean Patent application No. 10-2009-0129211 filed on Dec. 22, 2009, the entirety of all applications are incorporated herein by reference.

BACKGROUND OF THE INVENTION

1. Technical Field

The present invention relates to a varistor composition. More particularly, the present invention relates to a ZnO-based varistor composition including zinc oxide (ZnO) as a main component.

2. Description of the Related Art

A ZnO-based varistor, which includes a ZnO—Bi-based varistor and a ZnO—Pr-based varistor, is excellent at protecting electronic appliances from surge current because it has excellent voltage nonlinearity and a good ability to withstand surge current compared to a SiC-based varistor or a $SrTiO_3$-based varistor. Therefore, a ZnO-based varistor is generally used as a surge protective device.

The ZnO—Bi-based varistor includes $Bi_2O_3$, $Sb_2O_3$, Mn, Co, Ni, Cr, glass frit, Al, K and the like. However, since $Bi_2O_3$ has low resistance to ESD (electro-static discharge), the ZnO—Bi-based varistor including the same also has low resistance to ESD (electro-static discharge). Further, since the concentration of $Sb_2O_3$ is regulated because $Sb_2O_3$ is a carcinogen, the production of the ZnO—Bi-based varistor including the same is also regulated. Meanwhile, the ZnO—Pr-based varistor has good voltage nonlinearity, but has large leak current compared to the ZnO—Bi-based varistor. Further, since the ZnO—Pr-based varistor contains Pr which is a precious metal, it must be sintered at high temperature (1200° C. or more). Further, since the ZnO—Pr-based varistor includes a large amount of high-priced components (Pd and the like), its production cost is high.

Meanwhile, recently, as electronic devices became light, thin, small and highly-functional, electronic components have been densely surface-mounted on an electronic device. In the electronic device surface-mounted with electronic components, the signal speed of a circuit is several MHz to several GHz, which is a rapid signal speed. In this rapid signal speed, in order to prevent signal delay, the capacitance of a varistor must be lowered, and, if necessary, may be lowered to 1 pF or less.

Since the ZnO-based varistor has a high specific dielectric constant of several hundreds, the area of an electrode must be reduced in order for the ZnO-based varistor to have low capacitance. However, when the area of an electrode is reduced to impart the ZnO-based varistor with low capacitance, surge resistance is lowered, and the manufacturing process thereof becomes complicated. Therefore, it is required to develop a ZnO-based varistor having a low dielectric constant.

SUMMARY OF THE INVENTION

Accordingly, the present invention has been devised to solve the above-mentioned problems, and an object of the present invention is to provide a ZnO-based varistor composition, which includes new components instead of $Bi_2O_3$ having a negative influence on the electrostatic discharge characteristics of a varistor, $Sb_2O_3$ regulated for environmental purposes and Pr-based components requiring high-temperature sintering and increasing the manufacturing cost of a varistor, which generally has excellent physical properties such as nonlinearity required for a varistor, etc., and which can have low clamping voltage as well as low capacitance.

In order to accomplish the above object, an aspect of the present invention provides a ZnO-based varistor composition, including Ca, Co, Cr and La, wherein the composition does not include $Bi_2O_3$, $Sb_2O_3$ and $Pr_6O_{11}$, and selectively includes Mg.

The ZnO-based varistor composition may include 35~98 at % of Zn, 0.2~30 at % of Ca, 0~30 at % of Mg, 0.2~5 at % of Co, 0.05~3 at % of Cr and 0.05~3 at % of La, based on a total amount of metal atoms included in the composition.

Another aspect of the present invention provides a ZnO-based varistor manufactured using the composition.

DESCRIPTION OF THE PREFERRED EMBODIMENTS

The present invention provides a ZnO-based varistor composition, comprising Ca, Co, Cr and La, wherein the composition does not include $Bi_2O_3$, $Sb_2O_3$ and $Pr_6O_{11}$, and selectively includes Mg.

The ZnO-based varistor composition may include 35~98 at % of Zn, 0.2~30 at % of Ca, 0~30 at % of Mg, 0.2~5 at % of Co, 0.05~3 at % of Cr and 0.05~3 at % of La, based on a total amount of metal atoms included in the composition.

Among the components constituting the ZnO-based varistor composition, Mg is selectively included. Therefore, 0 at % of Mg means that the composition does not include Mg.

In the ZnO-based varistor composition, when Ca is included in an amount of 0.2~30 at %, the ZnO-based varistor composition has excellent physical properties, and, particularly, exhibits excellent nonlinearity. Further, the ZnO-based varistor composition may have low capacitance and low clamping voltage.

CaO and/or $CaCO_3$, each of which is a form of Ca used to perform the addition, does not react with ZnO, and is mostly trapped or distributed at a grain boundary. When Ca is distributed at a grain boundary, the interface density induced by $CoO_x$, $CrO_x$ and $LaO_x$, each of which is a component for improving nonlinearity, is effectively formed, thus greatly improving nonlinearity.

When the amount of Ca is less than 0.2 at %, the effect caused by the addition of Ca cannot be obtained. Further, when the amount thereof is more than 30 at %, the amount of Zn in the composition is relatively decreased, so that the composition is not easily sintered, with the result that sintered density is decreased, thereby deteriorating the physical properties of a varistor.

When Mg is included in the ZnO-based varistor composition, the ZnO-based varistor composition has excellent physical properties, and, particularly, exhibits low capacitance and low clamping voltage.

MgO and/or $MgCO_3$, each of which is a form of Mg used to perform the addition, have dielectric constants of 9.8 and 8.1, respectively. Each of MgO and/or $MgCO_3$ reacts with ZnO to form a solid solution and has the function of effectively decreasing the dielectric constant of the composition and not decreasing the nonlinearity of the composition depending on the added amount thereof.

However, when the amount of Mg is more than 30 at %, the amount of Zn in the composition is relatively decreased, so that the composition is not easily sintered, with the result that sintered density is decreased, thereby deteriorating the physical properties of a varistor.

In the ZnO-based varistor composition, when Co is included in an amount of 0.2~5 at %, the ZnO-based varistor composition has excellent nonlinearity. When the amount of Co is less than 0.2 at %, the effect caused by the addition of Co cannot be obtained. Further, when the amount thereof is more than 5 at %, leak current increases, nonlinearity decreases, and the specific resistance of ZnO increases, thus deteriorating the characteristics of a varistor.

In the ZnO-based varistor composition, when Cr is included in an amount of 0.05~3 at %, the ZnO-based varistor composition has excellent specific resistance. When the amount of Cr is less than 0.05 at %, the effect caused by the addition of Cr cannot be obtained. Further, when the amount thereof is more than 3 at %, nonlinearity decreases, and leak current increases.

In the ZnO-based varistor composition, when La is included in an amount of 0.05~3 at %, the ZnO-based varistor composition has excellent specific resistance. When the amount of La is less than 0.05 at %, the effect caused by the addition of La cannot be obtained. Further, when the amount thereof is more than 3 at %, nonlinearity decreases, and leak current increases.

The ZnO-based varistor composition may include 89~98 at % of Zn, 0.2~10 at % of Ca, 0.2~5 at % of Co, 0.05~3 at % of Cr and 0.05~3 at % of La, based on a total amount of metal atoms included in the composition. In this case, the composition may further include 0~10.5 at % of Mg. Preferably, the composition may include 92~98 at % of Zn, 0.2~4 at % of Ca, 0.2~2.5 at % of Co, 0.05~1 at % of Cr and 0.05~0.5 at % of La, based on a total amount of metal atoms included in the composition. Since this varistor composition can greatly improve nonlinear characteristics and clamping characteristics, it can be suitably used to manufacture a high-performance ZnO-based varistor.

The ZnO-based varistor composition may include 35~98 at % of Zn, 0.2~30 at % of Ca, 1~30 at % of Mg, 0.2~5 at % of Co, 0.05~3 at % of Cr and 0.05~3 at % of La, based on a total amount of metal atoms included in the composition. More preferably, the composition may include 45~97 at % of Zn, 0.2~30 at % of Ca, 1~30 at % of Mg, 0.2~2.5 at % of Co, 0.05~1 at % of Cr and 0.05~0.5 at % of La. This varistor composition can be suitably used to manufacture a varistor having low capacitance and low clamping voltage.

The ZnO-based varistor composition of the present invention may further include 0.005~0.2 at % of Al based on a total amount of metal atoms included in the composition.

Further, the ZnO-based varistor composition of the present invention may further include 0.005~0.2 at % of a metal based on a total amount of metal atoms included in the composition. Examples of the metal may include Mn, Zr, Li, Na, K, Ga and the like, and they may be used independently or in combinations thereof.

In the ZnO-based varistor composition of the present invention, Zn may be added in the form of ZnO, Ca may be added in the form of $CaCO_3$, CaO or a mixture thereof, Mg may be added in the form of MgO, $MgCO_3$ or a mixture thereof; Cr may be added in the form of $Cr_2O_3$, and La may be added in the form of $La_2O_3$.

The present invention provides a ZnO-based varistor manufactured using the varistor composition, and provides an electronic device including the ZnO-based varistor.

The ZnO-based varistor may be manufactured by the steps of: pulverizing and calcining a ZnO-based varistor composition to prepare calcined powder, the ZnO-based varistor composition including 35~98 at % of Zn, 0.2~30 at % of Ca, 0~30 at % of Mg, 0.2~5 at % of Co, 0.05~3 at % of Cr and 0.05~3 at % of La, based on a total amount of metal atoms included in the composition; mixing the calcined powder with a binder and then molding and sintering the mixture to form a sintered body; and coating the sintered body with an electrode and then packaging the sintered body.

This method is commonly known, except that the components that are used are novel.

Hereinafter, the present invention will be described in more detail with reference to the following Examples. However, these Examples are set forth to illustrate the present invention, and the scope of the present invention is not limited thereto. These Examples can be appropriately modified and changed by those skilled in the art within the scope of the present invention.

Example 1

Manufacture of a Laminated Varistor

ZnO 93.7843 g (Zn 96.6 at %) as a main component, $CaCO_3$ 4.7022 g (Ca 2.0 at %), $Co_3O_4$ 0.9487 g (Co 1.0 at %), $Cr_2O_3$ 0.1796 g (Cr 0.2 at %) and $La_2O_3$ 0.3851 g (La 0.2 at %) were put into a ball mill including ion-exchange water and partially-stabilized zirconia (PSZ) and then mixed and pulverized. Subsequently, the mixture was dewatered and dried to obtain coarse powder. Then, the obtained coarse powder was calcined at 700° C. for 2 hours in the air, and then sufficiently pulverized to prepare calcined powder.

Subsequently, BM2 (manufactured by SEKISUI Corp.) and BM-SZ (manufactured by SEKISUI Corp.) as organic binders, dioctyl phthalate (DOP) as an organic plasticizer, and toluene and ethanol as organic solvents were added to the calcined powder in predetermined amounts, and then wet-pulverized to prepare a slurry for forming a ceramic sheet.

Subsequently, this slurry was applied onto a PET (polyethylene terephthalate) film using a doctor blade method to form a ceramic sheet having a thickness of 25 μm. The ceramic sheet was cut in a predetermined size to form a plurality of ceramic sheets.

Subsequently, Pd paste was screen-printed on the surface of each of the ceramic sheets, and then one end thereof was extended, and the other end thereof was located on each of the ceramic sheets to form a rectangular electrode pattern. Then, the ceramic sheets each being provided with the electrode pattern were layered, and the layered ceramic sheets was interposed between the ceramic sheets (protective layers) each of which was not provided with the electrode pattern to obtain a laminate.

The obtained laminate was cut at a size of 1.6 mm×0.8 mm, and was then put into a Zr saggar. Then, a binder was removed from the laminate in the air at 400° C., and then the laminate was sintered in the air at 1200° C. for 3 hours to form a ceramic sintered body. Subsequently, both ends of the ceramic sintered body were coated with Ag paste, and then baked at 800° C. and external electrode was formed, thereby manufacturing a laminated varistor.

Figure 1:
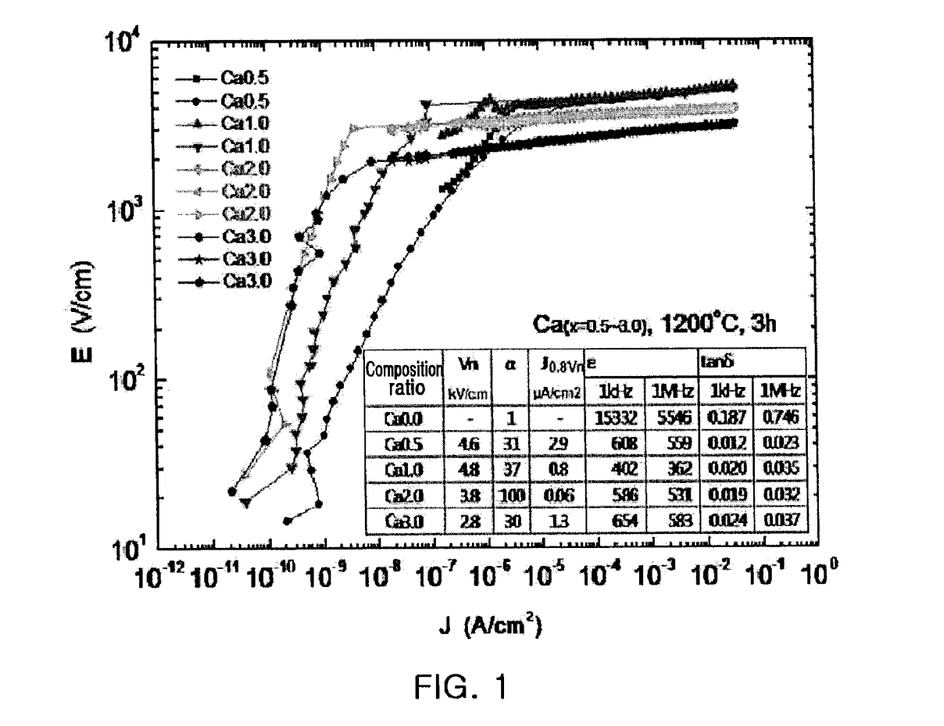
FIG. 1 is a graph showing the characteristics of ZnO-based varistors manufactured in Examples 1 to 4.
Figure 2:
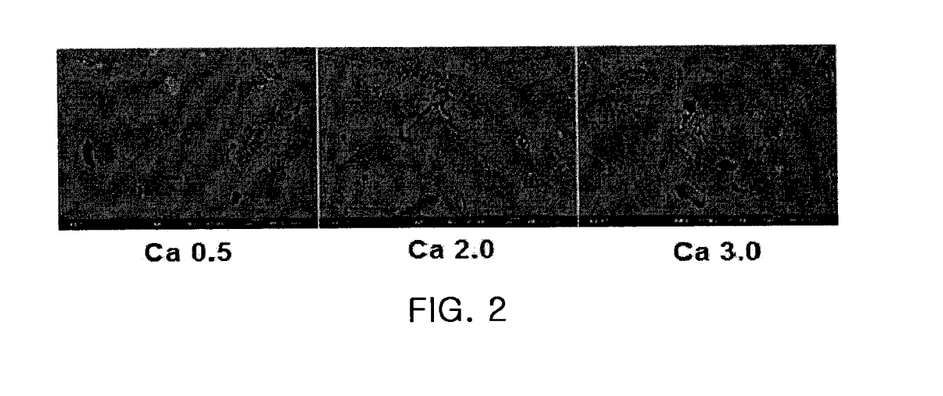
FIG. 2 shows the SEM images of ZnO-based varistors manufactured in Examples 1 and 2.

The voltage (V), nonlinear index ($\alpha$) and electrical dielectric loss coefficient of the varistor manufactured in this way were measured, and the results thereof are shown in FIG. 1. FIG. 2 shows the SEM images of the obtained ceramic sheets.

As shown in FIG. 1, it can be seen that the varistor composition of the present invention has excellent nonlinearity, a high voltage and an optimal dielectric loss efficient, thus exhibiting excellent characteristics. Particularly, it can be seen that the varistor composition has a very high nonlinear coefficient of 100 when it includes 2.0 at % of Ca.

Examples 2 to 4

Manufacture of Laminated Varistors

Laminated varistors were manufactured in the same manner as in Example 1, except that the raw material composition was changed as given in Table 1 below.

TABLE 1

| | | Powder | | | | |
|---|---|---|---|---|---|---|
| | Composition ratio At % | ZnO Zn 98.6-x at % | CaCO$_3$ Ca x: 0.5~3.0 at % | Co$_3$O$_4$ Co 1.0 at % | Cr$_2$O$_3$ Cr 0.2 at % | La$_2$O$_3$ La 0.2 at % |
| Exp. 2 | Ca 0.5 at % | 97.2538 g | 1.2006 g | 0.9689 g | 0.1835 g | 0.3933 g |
| Exp. 3 | Ca 1.0 at % | 96.0810 g | 2.3842 g | 0.9621 g | 0.1822 g | 0.3905 g |
| Exp. 4 | Ca 3.0 at % | 91.5506 g | 6.9567 g | 0.9357 g | 0.1772 g | 0.3798 g |

The voltage (V), nonlinear index ($\alpha$) and electrical dielectric loss coefficient of each of the varistors manufactured in this way were measured, and the results thereof are shown in FIG. 1. FIG. 2 shows the SEM images of the obtained ceramic sheets.

Examples 5 to 9

Manufacture of Laminated Varistors

Laminated varistors were manufactured in the same manner as in Example 1, except that the raw material composition was changed as given in Table 2 below.

TABLE 2

| | Powder | | | | |
|---|---|---|---|---|---|
| Components | Zn 97.6-x at % | Ca 2.0 at % | Co x: 0.5~5.0 at % | Cr 0.2 at % | La 0.2 at % |
| Exp. 5 | 97.1 at % | 2.0 at % | 0.5 at % | 0.2 at % | 0.2 at % |
| Exp. 6 | 95.6 at % | 2.0 at % | 2.0 at % | 0.2 at % | 0.2 at % |
| Exp. 7 | 94.6 at % | 2.0 at % | 3.0 at % | 0.2 at % | 0.2 at % |
| Exp. 8 | 93.6 at % | 2.0 at % | 4.0 at % | 0.2 at % | 0.2 at % |
| Exp. 9 | 92.6 at % | 2.0 at % | 5.0 at % | 0.2 at % | 0.2 at % |

The voltage (V), nonlinear index ($\alpha$), leak current, density and the like of each of the varistors manufactured in this way were measured, and the results thereof are given in Table 3 below.

TABLE 3

| | Components | Density (g/cm$^3$) | Vn (V/cm) | $\alpha$ | I$_L$ ($\mu$A/cm$^2$) |
|---|---|---|---|---|---|
| Exp. 5 | Co 0.5 at % | 94.3 | 4028 | 68 | 0.25 |
| Exp. 1 | Co 1.0 at % | 94.3 | 4281 | 78 | 0.18 |
| Exp. 6 | Co 2.0 at % | 93.9 | 4575 | 66 | 0.23 |
| Exp. 7 | Co 3.0 at % | 93.1 | 4386 | 28 | 0.30 |
| Exp. 8 | Co 4.0 at % | 93.5 | 4373 | 35 | 0.25 |
| Exp. 9 | Co 5.0 at % | 93.9 | 4852 | 54 | 0.36 |

As given in Table 3 above, it can be seen that the varistor composition of the present invention has excellent nonlinearity, a high voltage, low leak current and high density, thus exhibiting excellent characteristics.

Examples 10 to 14

Manufacture of Laminated Varistors

Laminated varistors were manufactured in the same manner as in Example 1, except that the raw material composition was changed as given in Table 4 below.

TABLE 4

| | Powder | | | | |
|---|---|---|---|---|---|
| Components | Zn 96.8-x at % | Ca 2.0 at % | Co 1.0 at % | Cr x: 0.1~3.0 at % | La 0.2 at % |
| Exp. 10 | 96.7 at % | 2.0 at % | 1.0 at % | 0.1 at % | 0.2 at % |
| Exp. 11 | 96.3 at % | 2.0 at % | 1.0 at % | 0.5 at % | 0.2 at % |
| Exp. 12 | 95.8 at % | 2.0 at % | 1.0 at % | 1.0 at % | 0.2 at % |
| Exp. 13 | 94.8 at % | 2.0 at % | 1.0 at % | 2.0 at % | 0.2 at % |
| Exp. 14 | 93.8 at % | 2.0 at % | 1.0 at % | 3.0 at % | 0.2 at % |

Figure 3:
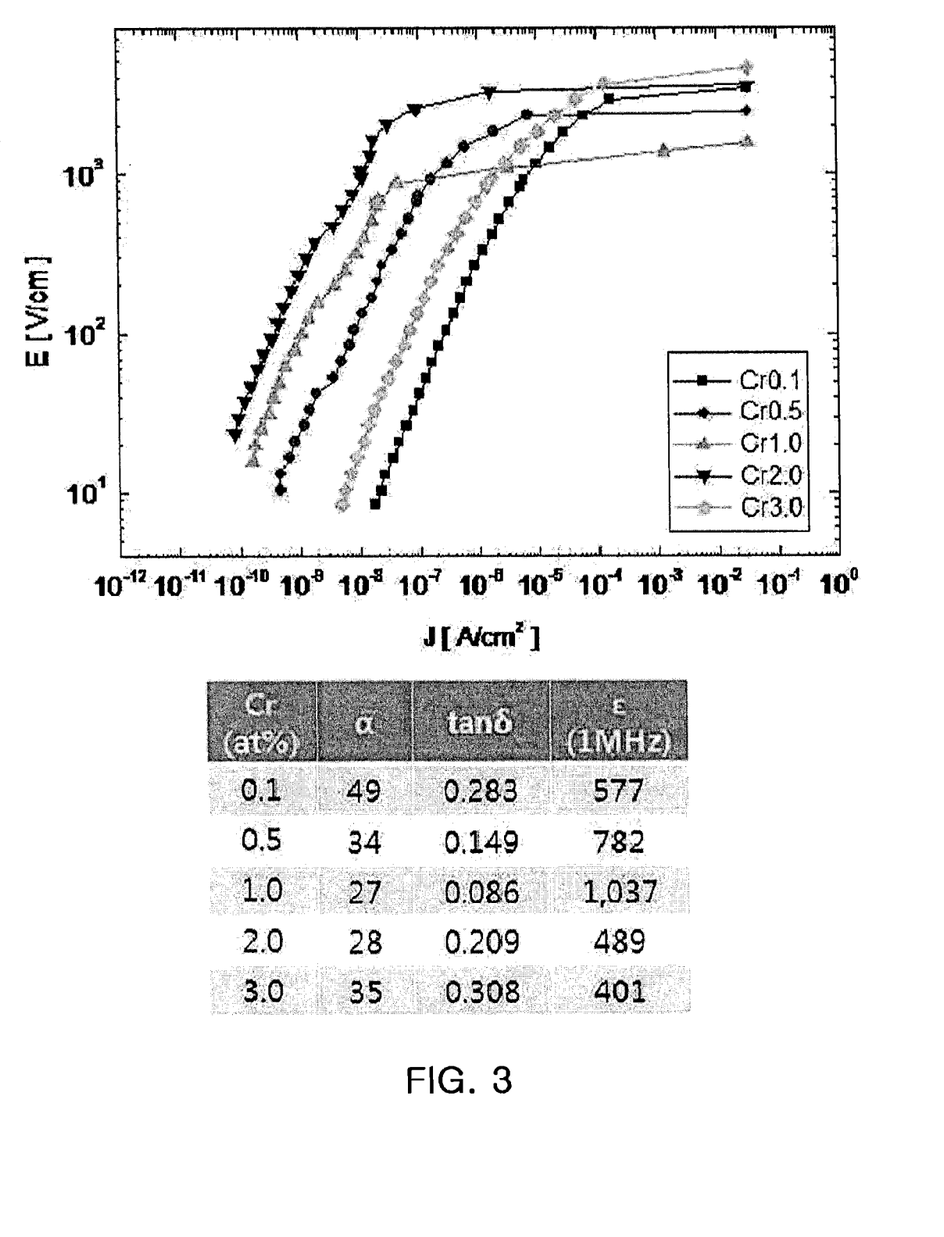
FIG. 3 is a graph showing the characteristics of ZnO-based varistors manufactured in Examples 10 to 14.

The voltage (V), nonlinear index (a), electrical dielectric loss coefficient, specific resistance and the like of each of the varistors manufactured in this way were measured, and the results thereof are shown in FIG. 3. As shown in FIG. 3, it can be seen that the varistor composition of the present invention has excellent nonlinearity, an optimal dielectric loss coefficient and an optical specific resistance, thus exhibiting excellent characteristics.

Examples 15 to 19

Manufacture of Laminated Varistors

Laminated varistors were manufactured in the same manner as in Example 1, except that the raw material composition was changed as given in Table 5 below.

TABLE 5

| | Powder | | | | |
|---|---|---|---|---|---|
| Components | Zn 96.8-x at % | Ca 2.0 at % | Co 1.0 at % | Cr 0.2 at % | La x: 0.1~3.0 at % |
| Exp. 15 | 96.7 at % | 2.0 at % | 1.0 at % | 0.2 at % | 0.1 at % |
| Exp. 16 | 96.3 at % | 2.0 at % | 1.0 at % | 0.2 at % | 0.5 at % |
| Exp. 17 | 95.8 at % | 2.0 at % | 1.0 at % | 0.2 at % | 1.0 at % |
| Exp. 18 | 94.8 at % | 2.0 at % | 1.0 at % | 0.2 at % | 2.0 at % |
| Exp. 19 | 93.8 at % | 2.0 at % | 1.0 at % | 0.2 at % | 3.0 at % |

Figure 4:
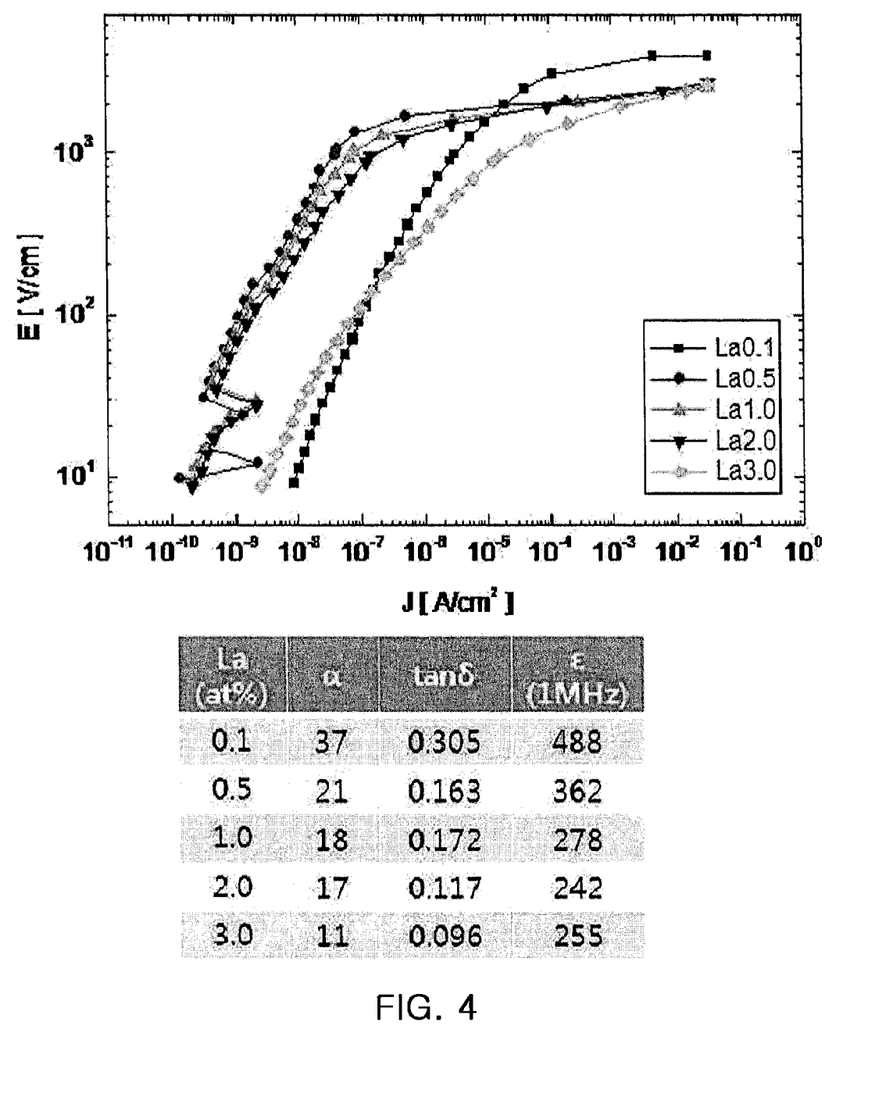
FIG. 4 is a graph showing the characteristics of ZnO-based varistors manufactured in Examples 15 to 19.

The voltage (V), nonlinear index (α), electrical dielectric loss coefficient, specific resistance and the like of each of the varistors manufactured in this way were measured, and the results thereof are shown in FIG. 4. As shown in FIG. 4, it can be seen that the varistor composition of the present invention exhibits optimal nonlinearity, an optimal dielectric loss coefficient, an optical specific resistance and the like.

Examples 20 to 24

Manufacture of Laminated Varistors

Laminated varistors were manufactured in the same manner as in Example 1, except that the raw material composition was changed as given in Table 6 below.

TABLE 6

| | Powder | | | | | |
|---|---|---|---|---|---|---|
| Components | Zn 96.6-x at % | Ca 2.0 at % | Co 1.0 at % | Cr 0.2 at % | La 0.2 at % | Al x: 0.01~0.20 at % |
| Exp. 20 | 96.59 at % | 2.0 at % | 1.0 at % | 0.2 at % | 0.2 at % | 0.01 at % |
| Exp. 21 | 96.58 at % | 2.0 at % | 1.0 at % | 0.2 at % | 0.2 at % | 0.02 t % |
| Exp. 22 | 96.55 at % | 2.0 at % | 1.0 at % | 0.2 at % | 0.2 at % | 0.05 at % |
| Exp. 23 | 96.50 at % | 2.0 at % | 1.0 at % | 0.2 at % | 0.2 at % | 0.10 at % |
| Exp. 24 | 96.40 at % | 2.0 at % | 1.0 at % | 0.2 at % | 0.2 at % | 0.20 at % |

Figure 5:
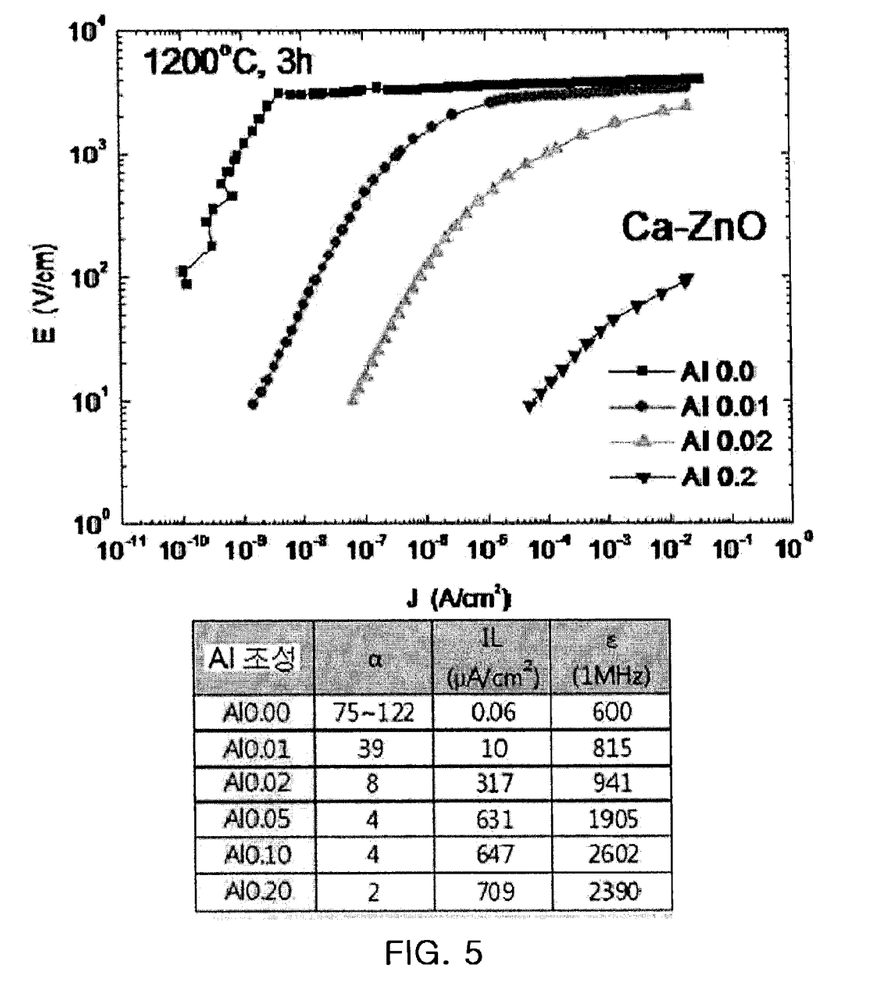
FIG. 5 is a graph showing the characteristics of ZnO-based varistors manufactured in Examples 20 to 24.

The voltage (V), nonlinear index (α), electrical dielectric loss coefficient, specific resistance and the like of each of the varistors manufactured in this way were measured, and the results thereof are shown in FIG. 5. As shown in FIG. 5, it can be seen that the varistor composition of the present invention exhibits optimal nonlinearity, an optimal dielectric loss coefficient and an optimal specific resistance and the like even when it includes a small amount of Al.

Examples 25 to 29

Manufacture of Laminated Varistors

Laminated varistors were manufactured in the same manner as in Example 1, except that the raw material composition was changed as given in Table 7 below.

TABLE 7

| | Powder | | | | | |
|---|---|---|---|---|---|---|
| Components | Zn 96.6-x at % | Ca 2.0 at % | Co 1.0 at % | Cr 0.2 at % | La 0.2 at % | Zr x: 0.1~3.0 at % |
| Exp. 25 | 96.5 at % | 2.0 at % | 1.0 at % | 0.2 at % | 0.2 at % | 0.1 at % |
| Exp. 26 | 96.1 at % | 2.0 at % | 1.0 at % | 0.2 at % | 0.2 at % | 0.5 t % |
| Exp. 27 | 95.6 at % | 2.0 at % | 1.0 at % | 0.2 at % | 0.2 at % | 1.0 at % |
| Exp. 28 | 94.6 at % | 2.0 at % | 1.0 at % | 0.2 at % | 0.2 at % | 2.0 at % |
| Exp. 29 | 93.6 at % | 2.0 at % | 1.0 at % | 0.2 at % | 0.2 at % | 3.0 at % |

Figure 6:
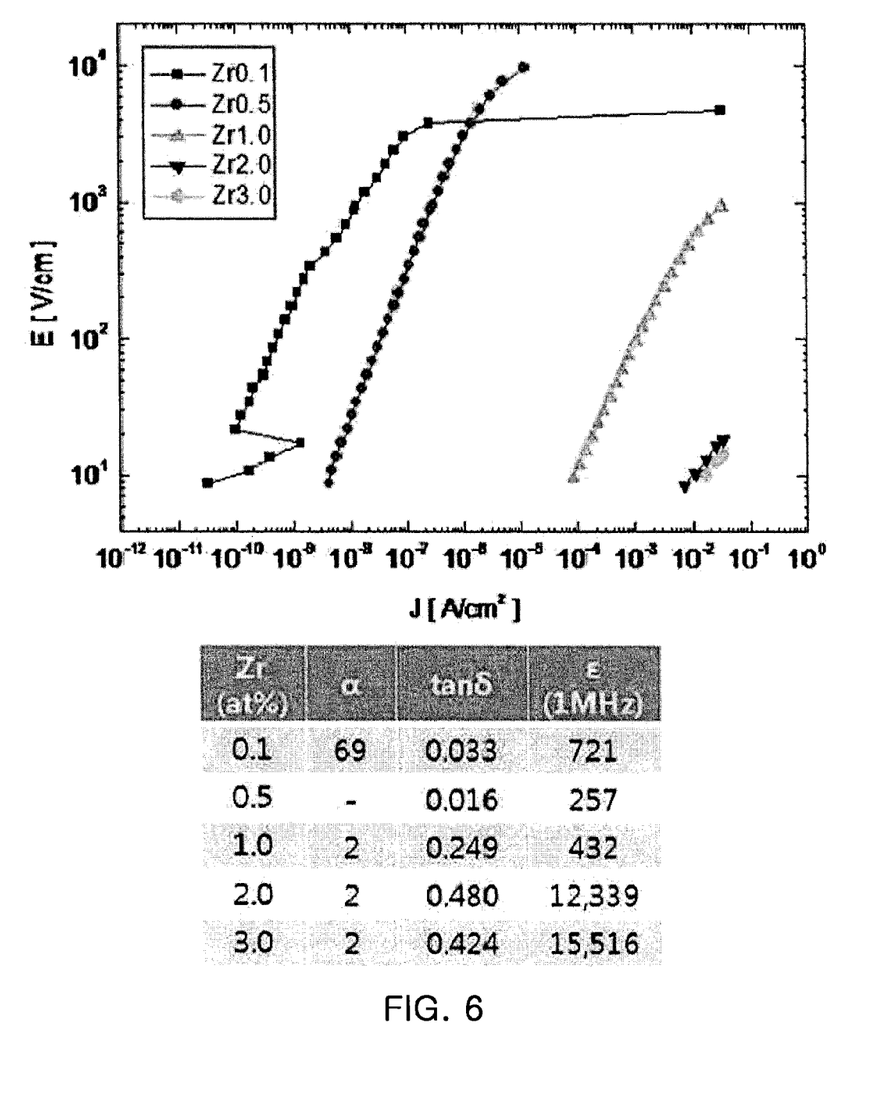
FIG. 6 is a graph showing the characteristics of ZnO-based varistors manufactured in Examples 25 to 29.

The voltage (V), nonlinear index (α), electrical dielectric loss coefficient, specific resistance and the like of each of the varistors manufactured in this way were measured, and the results thereof are shown in FIG. 6. As shown in FIG. 6, it can be seen that the varistor composition of the present invention exhibits optimal nonlinearity, an optimal dielectric loss coefficient and an optimal specific resistance and the like even when it includes a small amount of Zr.

Examples 30 to 34

Manufacture of Laminated Varistors

Laminated varistors were manufactured in the same manner as in Example 1, except that sintering temperature and sintering time were changed as given in Table 8 below.

TABLE 8

| | Sintering temperature (° C.) | Sintering time (h) | Density (g/cm$^3$) | Vn (V/cm) | α | $I_L$ (μA/cm$^2$) |
|---|---|---|---|---|---|---|
| Exp. 30 | 1100 | 3 | 89.8 | — | — | — |
| Exp. 1 | 1200 | 3 | 94.3 | 4281 | 78 | 0.18 |
| Exp. 31 | 1300 | 3 | 97.3 | 1009 | 41 | 7 |
| Exp. 32 | 1350 | 3 | 96.7 | 745 | 18 | 36 |
| Exp. 33 | 1200 | 1 | 92.8 | 4836 | 51 | 0.31 |
| Exp. 34 | 1200 | 5 | 96.6 | 2822 | 46 | 0.28 |

As given in Table 8, it can be seen that the varistor composition of the present invention exhibits optimal characteristics in terms of density, voltage, nonlinearity and leak current when it was sintered at 1200° C. for 3 hours.

Examples 35 to 51

Manufacture of Laminated Varistors

Laminated varistors were manufactured in the same manner as in Example 1, except that the raw material composition was changed as given in Table 9 below and the prepared slurry was applied onto a PET (polyethylene terephthalate) film to form a sheet having a thickness of about 33 μm.

TABLE 9

| | Powder | | | | | | |
|---|---|---|---|---|---|---|---|
| | ZnO Zn at % | CaCO₃ Ca at % | MgO Mg at % | Co₃O₄ Co at % | Cr₂O₃ Cr at % | La₂O₃ La at % | Al₂O₃ Al at % |
| Exp. 35 | 87.6 | 10 | 1 | 1 | 0.2 | 0.2 | — |
| Exp. 36 | 85.6 | 10 | 3 | 1 | 0.2 | 0.2 | — |
| Exp. 37 | 83.6 | 10 | 5 | 1 | 0.2 | 0.2 | — |
| Exp. 38 | 81.1 | 10 | 7.5 | 1 | 0.2 | 0.2 | — |
| Exp. 39 | 78.6 | 10 | 10 | 1 | 0.2 | 0.2 | — |
| Exp. 40 | 68.6 | 10 | 20 | 1 | 0.2 | 0.2 | — |
| Exp. 41 | 58.6 | 10 | 30 | 1 | 0.2 | 0.2 | — |
| Exp. 42 | 66.6 | 2 | 30 | 1 | 0.2 | 0.2 | — |
| Exp. 43 | 58.6 | 30 | 10 | 1 | 0.2 | 0.2 | — |
| Exp. 44 | 38.6 | 30 | 30 | 1 | 0.2 | 0.2 | — |
| Exp. 45 | 66.59 | 2 | 30 | 1 | 0.2 | 0.2 | 0.01 |
| Exp. 46 | 58.59 | 10 | 30 | 1 | 0.2 | 0.2 | 0.01 |
| Exp. 47 | 38.59 | 30 | 30 | 1 | 0.2 | 0.2 | 0.01 |
| Exp. 48 | 38.58 | 30 | 30 | 1 | 0.2 | 0.2 | 0.02 |
| Exp. 49 | 38.57 | 30 | 30 | 1 | 0.2 | 0.2 | 0.03 |
| Exp. 50 | 38.55 | 30 | 30 | 1 | 0.2 | 0.2 | 0.05 |
| Exp. 51 | 38.50 | 30 | 30 | 1 | 0.2 | 0.2 | 0.10 |

The relative density, voltage (V), leak current (IL), nonlinear index (α), dielectric constant (∈) and specific resistance (ρ) to ZnO of each of the varistors manufactured in this way were measured, and the results thereof are given in Table 10 below.

TABLE 10

| | Characteristics of Powder composition | | | | Results of measuring physical properties | | | | | |
|---|---|---|---|---|---|---|---|---|---|---|
| Examples (sample thickness) | ZnO Zn at % | CaCO₃ Ca at % | MgO Mg at % | Al₂O₃ Al at % | Relative density(%) | Vn (V/μm) | IL (μA/cm²) | α | ∈ 1 MHz | ρ (Ωcm) |
| Exp. 35 | 87.6 | 10 | 1 | — | 98.8 | 0.580 | — | 81 | 547 | 0.8 |
| Exp. 36 | 85.6 | 10 | 3 | — | 96.9 | 0.594 | — | 31 | 468 | 1.1 |
| Exp. 37 | 83.6 | 10 | 5 | — | 95.5 | 0.693 | — | 84 | 392 | 1.1 |
| Exp. 38 | 81.1 | 10 | 7.5 | — | 92.9 | 0.836 | — | 157 | 329 | 1.2 |
| Exp. 39 | 78.6 | 10 | 10 | — | 90.9 | — | — | 46 | 269 | 1.4 |
| Exp. 40 | 68.6 | 10 | 20 | — | 92.0 | — | — | — | 132 | 1.7 |
| Exp. 41 | 58.6 | 10 | 30 | — | 93.0 | — | — | — | 82 | 2.1 |
| Exp. 42 | 66.6 | 2 | 30 | — | 92.0 | — | — | — | 79 | 1.9 |
| Exp. 43 | 58.6 | 30 | 10 | — | 94.0 | 2.19 | 0.8 | 45 | 25 | 2.1 |
| Exp. 44 | 38.6 | 30 | 30 | — | 94.7 | 2.06 | 3 | 56 | 35 | 2.2 |
| Exp. 45 | 66.59 | 2 | 30 | 0.01 | 95.0 | 1.38 | 0.2 | 79 | 127 | 1.9 |
| Exp. 46 | 58.59 | 10 | 30 | 0.01 | 95.3 | 1.40 | 0.3 | 62 | 89 | 1.9 |
| Exp. 47 | 38.59 | 30 | 30 | 0.01 | 97.0 | 2.35 | 0.08 | 162 | 35 | 2.2 |
| Exp. 48 | 38.58 | 30 | 30 | 0.02 | 95.4 | 1.87 | 0.5 | 88 | 42 | 4.0 |
| Exp. 49 | 38.57 | 30 | 30 | 0.03 | 94.5 | 1.73 | 3 | 59 | 45 | 4.2 |
| Exp. 50 | 38.55 | 30 | 30 | 0.05 | 95.4 | 1.77 | 89 | 15 | 44 | 3.4 |
| Exp. 51 | 38.50 | 30 | 30 | 0.10 | 96.1 | 1.22 | 313 | 9 | 52 | 4.3 |

Figure 7:
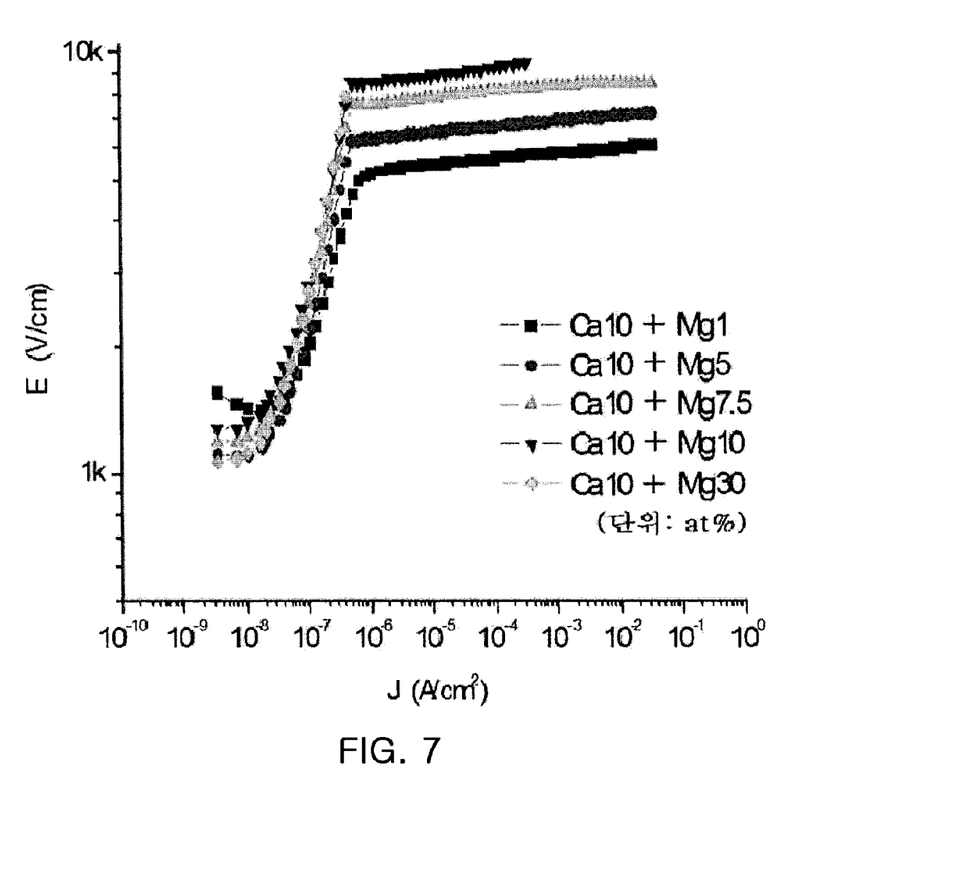
FIG. 7 is a graph showing the I-V curves of ZnO-based varistors manufactured in Examples 35, 37~39 and 41.

As given in Table 10, it was ascertained that the varistors manufactured using the varistor compositions of the present invention exhibited high density, high voltage, low leak current and optimal specific resistance. Particularly, it was ascertained that, since the varistor composition has excellent non-linearity (refer to FIG. 7) and a very low dielectric constant, a varistor having low capacitance without regard to electrode area can be manufactured.

Figure 8:
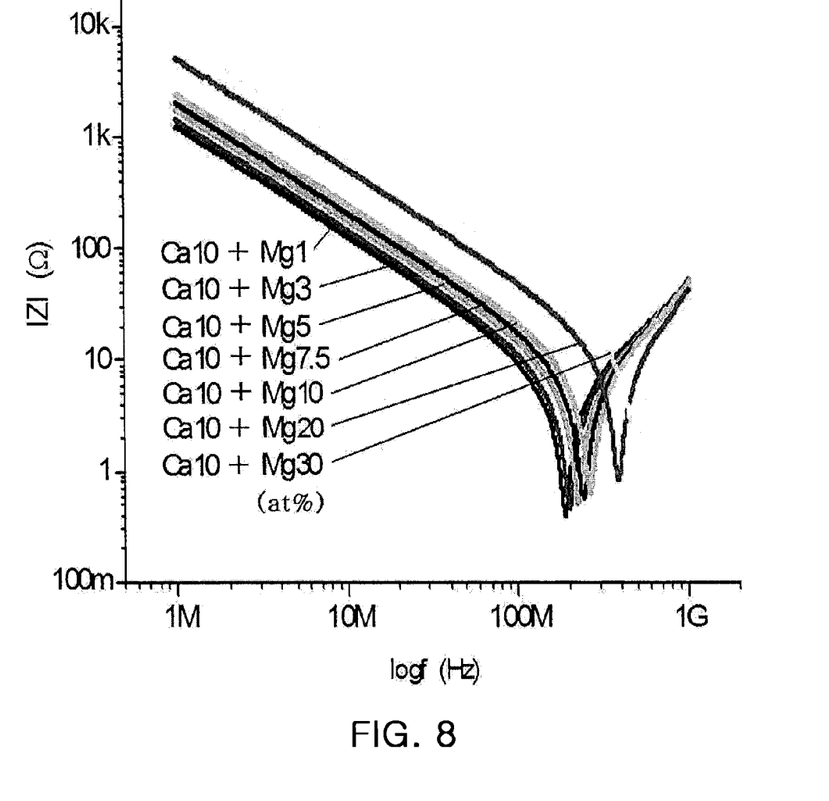
FIG. 8 is a graph showing the IZI($\Omega$)-Freq. curves of ZnO-based varistors manufactured in Examples 35~41.
Figure 9:
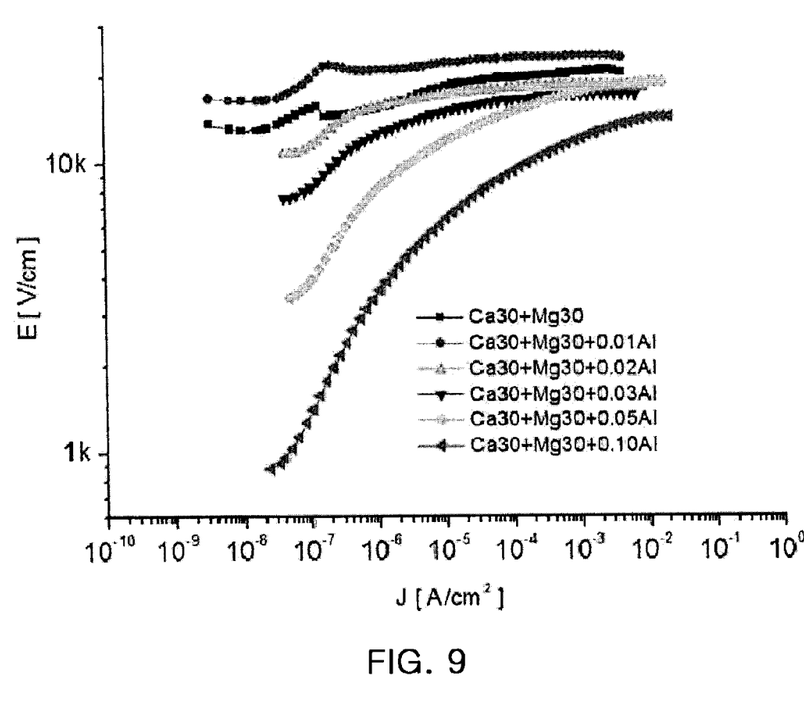
FIG. 9 is a graph showing the I-V curves of ZnO-based varistors manufactured in Examples 44 and 47~51.
Figure 10:
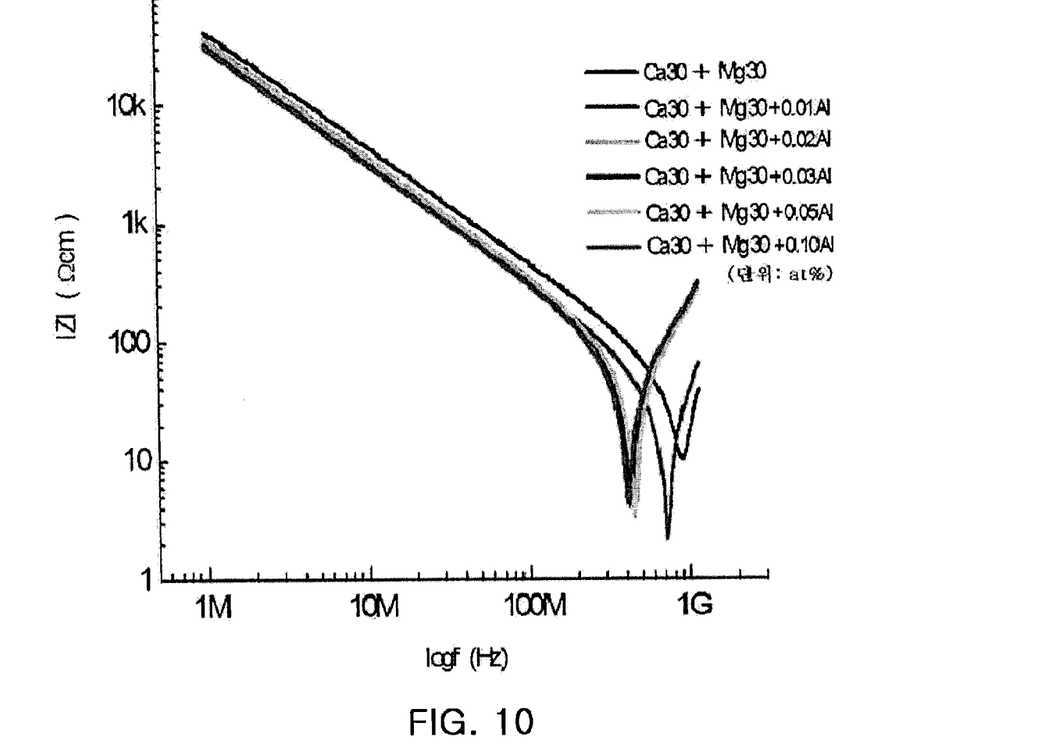
FIG. 10 is a graph showing the IZI($\Omega$)-Freq. curves of ZnO-based varistors manufactured in Examples 44 and 47~51.

In the present invention, the specific resistance of ZnO particles can be measured in order to improve the high-current characteristics and clamping voltage characteristics of a varistor. FIGS. 8 and 10 show the IZI measured at a range of 1 MHz~3 GHz using a RF impedance/Material Analyzer (Agilent E4991A). In the graphs of FIGS. 8 and 10, the minimum value of IZI represents the resistance of ZnO particles, and the characteristics of the varistor composition become excellent as this specific resistance thereof becomes low. As shown in FIGS. 8 and 10, the specific resistance of ZnO particles was low, and thus the varistor composition generally exhibited excellent characteristics.

Example 52

Manufacture of a Laminated Varistor

Laminated varistors were manufactured in the same manner as in Example 1, except that the raw material composition was changed as given in Table 11 below, the prepared slurry was applied onto a PET (polyethylene terephthalate) film to form a sheet having a thickness of about 20 μm, and the sintering temperature was set 1180□.

TABLE 11

| | Powder | | | | | | |
|---|---|---|---|---|---|---|---|
| | ZnO Zn at % | CaCO₃ Ca at % | MgO Mg at % | Co₃O₄ Co at % | Cr₂O₃ Cr at % | La₂O₃ La at % | Al₂O₃ Al at % |
| Exp. 52 | 89.6 | 4 | 5 | 1 | 0.2 | 0.2 | — |

The electrical characteristics and ESD characteristics of the varistors manufactured in this way were evaluated by a general method, and the results thereof are given in Table 12 and Table 13 below.

TABLE 12

| Test conditions | | Electrical characteristics | | | | | | | |
|---|---|---|---|---|---|---|---|---|---|
| Laminate thickness | Holding time | P-Vn(V) | N-Vn(V) | P-Alpha | P-Alpha | P-IL (μm) | N-IL (μm) | Cp (pF) | R (MΩ) |
| 20 μm, 3/1 | 1 hr | 11.2 | 11.3 | 18.5 | 18.8 | 1.554 | 1.520 | 160.2 | 454.7 |
| 20 μm, 3/1 | 3 hr | 6.8 | 6.9 | 13.8 | 13.9 | 4.674 | 4.365 | 148.0 | 1.02 |

TABLE 13

| Test conditions | | | ESD Resistance | | | | | |
|---|---|---|---|---|---|---|---|---|
| Laminate thickness | Holding time | ESD attenuation waveform | 8 kV | | | 15 kV | | |
| | | | + | − | | + | − | |
| 20 μm, 3/1 | 1 hr | 213.6 | 37.3 | 19.7 | 2.21 | 2.26 | 1.40 | 0.56 |
| 20 μm, 3/1 | 3 hr | 193.1 | 32.5 | 12.0 | 2.39 | 2.26 | 3.00 | 2.48 |

From the test results, it can be ascertained that the varistor composition of the present invention has excellent electrical characteristics and ESD resistance compared to a conventional Bi-based varistor composition, and that the change rate of the varistor composition after applying ESD is 3% or less and thus the composition is stable.

As described above, the varistor composition of the present invention provides excellent electrostatic discharge (ESD) characteristics because it has excellent physical properties, such as a nonlinear coefficient, a clamping voltage ratio, a surge absorbance and the like, and, particularly, does not include $Bi_2O_3$. Further, the varistor composition provides high work safety because it does not include $Sb_2O_3$ that is regulated for the sake of the environment. Further, the varistor composition can reduce the manufacturing cost of a varistor because it does not use Pr-based components that require high-temperature sintering and increase the manufacturing cost of a varistor. Particularly, since the varistor composition has a low clamping voltage as well as a low capacitance, this varistor composition can be used to manufacture a varistor that does not cause signal delay even when used in an electronic product having a signal speed of several MHz to several GHz.

What is claimed is:

1. A ZnO-based varistor composition, comprising 35~98 at % of Zn, 10~30 at % of Ca, 10~30 at % of Mg, 0.2~5 at % of Co, 0.05~3 at % of Cr and 0.05~3 at % of La, based on a total amount of metal atoms included in the composition, wherein the composition does not comprise $Bi_2O_3$, $Sb_2O_3$ and $Pr_6O_{11}$.

2. The ZnO-based varistor composition according to claim 1, further comprising 0.005~0.2 at % of Al, based on a total amount of metal atoms included in the composition.

3. The ZnO-based varistor composition according to claim 1, further comprising 0.01~30 at % of a metal based on a total amount of metal atoms included in the composition in addition to Zn, Ca, Mg, Co, Cr and La.

4. The ZnO-based varistor composition according to claim 3, wherein the metal is at least one selected from the group consisting of Mn, Zr, Li, Na, K and Ga.

5. The ZnO-based varistor composition according to claim 1, wherein Zn is added in the form of ZnO, Ca is added in the form of $CaCO_3$, CaO or a mixture thereof, Mg is added in the form of MgO, $MgCO_3$ or a mixture thereof, Cr is added in the form of $Cr_2O_3$, and La is added in the form of $La_2O_3$.

6. A ZnO-based varistor, manufactured using the ZnO-based varistor composition of claim 1.

7. The ZnO-based varistor composition according to claim 1, wherein the composition comprises 20~30 at % of Mg.

8. The ZnO-based varistor composition according to claim 1, further comprising 0.5~3.0 at % of Zr.

9. The ZnO-based varistor composition according to claim 1, wherein the composition comprises 35~66.6 at % of Zn.

10. The ZnO-based varistor composition according to claim 1, wherein the composition comprises 35~78.6 at % of Zn.

11. The ZnO-based varistor composition according to claim 1, wherein the composition comprises 2~3 at % of Cr.

12. The ZnO-based varistor composition according to claim 1, wherein the composition comprises Li.

13. The ZnO-based varistor composition according to claim 1, wherein the composition comprises 0.005~0.2 at % of Li.

14. A ZnO-based varistor composition comprising Zn, Ca, Co, Cr, La and 20~30 at % of Mg, wherein the composition does not comprise Pr, Bi, and Sb.

15. The ZnO-based varistor composition according to claim 14, further comprising 0.5~3.0 at % of Zr.

16. The ZnO-based varistor composition according to claim 14, wherein the composition comprises 35~66 at % of Zn.

17. The ZnO-based varistor composition according to claim 14, wherein the composition comprises 2~3 at % of Cr.

18. The ZnO-based varistor composition according to claim 14, wherein the composition comprises Li.

19. The ZnO-based varistor composition according to claim 14, wherein the composition comprises 0.005~0.2 at % of Li.

* * * * *